United States Patent [19]
DeBardeleben, Jr.

[11] 3,709,941
[45] Jan. 9, 1973

[54] DINITRIMINES
[75] Inventor: John F. DeBardeleben, Jr., Richmond, Va.
[73] Assignee: Philip Morris Incorporated, New York, N.Y.
[22] Filed: June 1, 1970
[21] Appl. No.: 42,586

[52] U.S. Cl. ............. 260/566 R, 149/92, 260/2.5 R, 260/999
[51] Int. Cl. ............................................. C07c 119/00
[58] Field of Search ................................... 260/566 R

[56] References Cited

OTHER PUBLICATIONS

Chemical Abstracts, Vol. 41, column 5506 (1947)

Primary Examiner—Leon Zitver
Assistant Examiner—Gerald A. Schwartz
Attorney—Watson, Leavenworth & Kelton

[57] ABSTRACT

Lower aliphatic dinitrimines are disclosed, including both open chain and cyclic dinitrimines. They are prepared by the reaction of a dioxime with dinitrogen tetroxide at low temperatures. The IR spectrum is compared with that of the known compound, camphor nitrimine and ultraviolet measurement indicate spectra typical of nitrimines. The compounds have uses in pharmacology, in tobacco, as blowing agents and as propellants.

8 Claims, No Drawings

DINITRIMINES

This invention relates to new and useful nitrimine compounds and more particularly relates to useful dinitrimines and a method for producing them.

The compounds known as nitrimines are also known as nitroimines or by the earlier term of pernitroso compounds. The latter term was based on the belief that the structure of the compounds should be indicated by a configuration such as

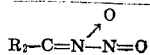

However, J. P. Freeman, J. Org. Chem. 26, 4190–4193 (1961) supplies support for a nitrimine structure indicated, for example, as $R_2C=N-NO_2$.

On the basis of the Freeman publication the compounds of the invention are considered to be dinitrimines and thus fall within the scope of the following illustrative structural formulas:

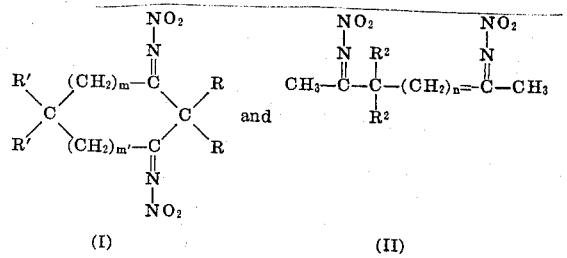

in which R and R' may be similar or different and represent either hydrogen or a lower alkyl preferably of one to six carbon atoms while $R^2$ is either hydrogen or a lower alkyl of one to two carbon atoms while $m$ and $m'$ are similar or dissimilar integers representing 0, 1 or 2, with n standing for the integer 0, 1, 2 or 3 and is 0 only when $R^2$ is a lower alkyl.

The compounds of the invention have been found useful as blowing agents for foaming of polymers, for example, high density polyethylenes. Such foamed polymers would find useful application in bedding, packaging material, etc. The compounds are also useful as propellants. When brought above a critical temperature, from about 135°C. to about 200°C., decomposition products are formed among which are acetone, branched-chain nitriles and gaseous products, the latter being largely NO and $NO_2$.

It has also been found that the cyclohexane-dinitrimines have substantial anti-viral activity when submitted to pharmacological examination under standard testing procedures. In such a test, mice are inoculated with the virus herpes simplex. The compound to be treated is administered subcutaneously and the number of survivors and survival time in each group (varying dosage as well as 0 dose control) are noted. Dosages of test compound were 40 and 400 µg, as well as 4 mg. and the activity of these dosages compared with controls. With the cyclohexane-dinitrimines anti-viral activity was noted not only at the microgram amounts indicated but at the dosage of 4 mg. without causing toxic manifestations. Such compounds would therefore have value in experimental or comparative pharmacology for anti-viral studies.

The process for the preparation of the compounds of the invention may be illustrated by the following reaction scheme, the various symbols being the same as previously mentioned:

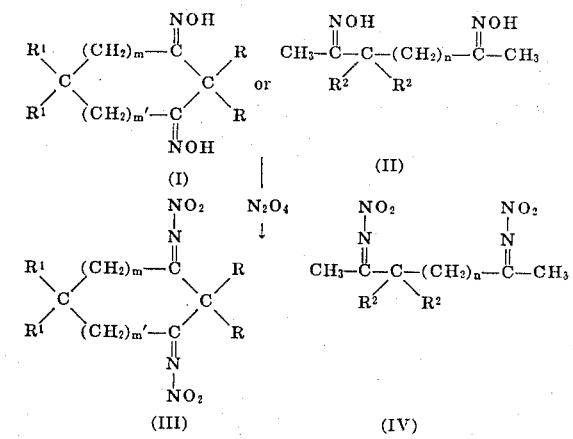

Cyclic compounds of the type shown in formula I are prepared by means known to the art. Thus, with respect to compounds of formula I, a selected α,β-unsaturated ketone may be reacted with dialkylmalonate, followed by hydrolysis, to a cyclic 1,3-diketo compound unsubstituted in the 2-position as essentially described in Org. Syn. Coll. Vol. II, 200 (1943). Alkylation at the 2-position may be carried out using a lower alkyl halide, for example, methyl bromide. The 1,3-dioxime is formed by reaction with hydroxylamine in an aqueous or alcoholic medium, following known procedures. With respect to non-cyclic aliphatic compounds of type II, one merely reacts the selected di-ketone with hydroxylamine as indicated.

In the preparation of the desired compounds III or IV, as will be noted above, the selected dioxime is dissolved in an inert solvent, such as dialkyl ethers, benzenoid or chlorinated solvents but preferably diethyl ether. The reaction may be carried out from −20° to 80°C., but preferably in the range of 0° to 10°C. Dinitrogen tetroxide in the same solvent is added dropwise to the extent of at least 2 mols per mol of dioxime with stirring and cooling if necessary to keep the reactants within the indicated temperature range. After the reaction is complete, the reactant mixture is concentrated, and the dinitrimine usually precipitates out of solution. Purification is carried out by conventional procedures to obtain a substantially pure, usually crystalline product.

The following examples are provided for greater detail and are illustrative of the best mode for carrying out the invention.

EXAMPLE 1

2,2-Dimethyl-1,3-dinitriminocyclohexane

A solution of 6.0 g. (0.035 mole) of 2,2-dimethyl-cyclohexane-1,3-dione dioxime in 300 ml. of absolute ethyl ether under nitrogen was cooled to 0°C. in an ice-salt bath. A cold solution of 6.6 g. (0.071 mole) of $N_2O_4$ in 100 ml. of ether was added dropwise with stirring over 30 minutes while maintaining the reaction mixture at 0° to 5°C. The clear solution turned green, and a white solid began to crystallize out. Stirring was continued for 1 hour while allowing the temperature to slowly rise. The solid was filtered and washed with ether yielding 3.0 g. of material, m.p. 147°–148° dec. Concentration of the ether solution of one-half its original volume gave an additional 0.8 g. of material with the same melting point. Recrystallization from a mixture of n-hexane/ether gave an analytical sample with melting point 149°–150°C. dec.* (*The melting point is variable depending on the rate of heating.) Ultraviolet $\lambda_{max}$ $^{95\% \ Et \ OH}$ 265 m$\mu$ is typical of nitrimines. The IR spectrum compared with that of camphor nitrimine. There is a medium band at 1610 and a weak band at 1627 cm$^{-1}$ (C=N), a strong band at 1567 cm$^{-1}$ (NO$_2$ asym.), a strong band at 1316 cm$^{-1}$(NO$_2$ sym.), medium bands at 885 cm$^{-1}$ (N—N) and 810 cm$^{-1}$ (N—O). NMR in CDCl$_3$ shows a singlet at $\delta$1.55, a multiplet at 2.0, and a multiplet at 2.75 integrating respectively for 6, 2 and 4 protons. These protons are identified, respectively, as those on the methyls, the 5-methylene, and the 4,6-methylene carbons. Anal. Calcd. for C$_8$H$_{12}$NO$_4$; C, 42.10; H, 5.30: N, 24.55. Found: C, 42.06; H, 5.49; N, 24.27.

EXAMPLE 2

1,3-Dinitrimino-2,2,5,5-tetramethylcyclohexane

A solution of 19.8 g. (0.1 mole) of 2,2,5,5-tetramethylcyclohexane-1,3-dione dioxime in 500 ml. of absolute ether under nitrogen was cooled to 5°C. in an ice bath. A cold solution of 32.2 g. (0.35 mole) of N$_2$O$_4$ in 150 ml. of ether was added dropwise with stirring while maintaining the temperature at 5° to 10°C. Stirring was continued for 4 hours at 5° to 10°C. and the reaction mixture then allowed to come to room temperature and stirred overnight. Most of the ether was removed with a stream of nitrogen and a solid crystallized out. This solid was removed by filtration and washed with n-hexane. The filtrate yielded a second crop of material. This was collected and combined with the original crystals. The total crude material was crystallized from 10/1 n-hexane/ether to give 17.1 g. (68 percent yield) of material with melting point 169°–170° dec.* (*The melting point is variable depending on the rate of heating.) Ultraviolet $\lambda_{max}^{95\%}$ $^{EtOH}$ 265 m$\mu$ is typical of nitrimines. The IR spectrum had peaks as follows: medium at 1608 and weak at 1628 cm$^{-1}$ (C=N), strong at 1567 and 1558 cm$^{-1}$ (NO$_2$ asym.), strong at 1316 cm$^{-1}$ (NO$_2$ sym.), and medium at 885 cm$^{-1}$ (N—N) and at 810 cm$^{-1}$ N—O). NMR in d$_6$-acetone showed singlets at $\delta$1.05, 1.55, and 2.7 integrating respectively for 6,6 and 4 protons. These are identified, respectively, as the protons on the 5,5-methyls, the 2,2-methyls, and the 4,6-methylene carbons. Anal. Calcd. for C$_{10}$H$_{16}$N$_4$O$_4$: C, 46.87; H, 6.29; N, 21.86. Found; C, 47.05; H, 6.48; N, 21.37.

When submitted to pharmacological evaluation the compound was found active against *herpes simplex* in standard test animals.

EXAMPLE 3 anti-1,3-Dinitrimino-2,2,4,4-tetramethylcyclobutane

A solution of 8.0 g. (0.047 mole) of 2,2,4,4-tetramethylcyclobutane-1,3-dione dioxime in 500 ml. of absolute ether under nitrogen was cooled to 5°C. in an ice bath. A cold solution of 13.8 g. (0.15 mole) of N$_2$O$_4$ in 250 ml. ether was added dropwise with stirring while maintaining the temperature at 0° to 5°C. The reaction mixture was allowed to come to room temperature and stirred overnight. The volume of solvent was reduced to 250 ml. by passing nitrogen over the solution. A white solid came out which was filtered and washed with n-hexane to give a crude material with melting point 130°–135°C. Three recrystallizations from n-heptane gave an analytical sample with melting point 134.5°–135° dec.* (*The melting point is variable depending on the rate of heating.)

Ultraviolet spectrum shows only end absorption. Very probably both *syn* and *anti* forms of the dinitrimine were produced. The form finally isolated in pure form is believed to be the *anti* form on the basis of the NMR spectrum and the absence of a UV peak, suggesting cancellation by opposed nitrimine groups. NMR in d$_6$-benzene shows a single peak at $\delta$1.1 corresponding to the equivalent methyl protons. In the *syn* form half the methyl protons would be deshielded by the nitro groups as compared with the other half, and two peaks would be expected. The spectrum of IR absorption had bands as follows: medium at 1660 cm$^{-1}$ (C=N), strong at 1586 cm$^{-1}$ (NO$_2$ asym.), strong at 1310 cm$^{-1}$ (NO$_2$ sym.), and medium at 888 cm$^{-1}$ (N—N) and 753 cm$^{-1}$ (N—O). Anal. calcd. for C$_8$H$_{12}$N$_4$O$_4$: C, 42.10; H, 5.30; N, 24.55. Found: C, 41.74; H, 5.28; N, 23.80.

Example 4

2,2-Diethyl-1,3-dinitriminocyclooctane

A solution of 11.1 g. (0.05 mole) of 2,2-diethylcyclooctane-1,3-dione dioxime dissolved in 300 ml. of absolute ethyl ether under nitrogen is cooled to 0°C. in an ice-salt bath. A cold solution of 9.2 g. (0.1 mole) of N$_2$O$_4$ in 150 ml. of ether is added dropwise with stirring over one hour while the mixture is maintained at 0° to 5°C. A solid begins to precipitate. Stirring is continued while the temperature is allowed to rise. The solid is removed by filtration and more solid is recovered by concentration of the solution to about one-half its volume. The product is recrystallized from n-hexane/ether and its identity as the dinitrimine is confirmed by analysis and absorption spectra as in preceding examples.

The treatment of the dioxime of 2-ethyl-2-methylcyclopentane-dione-1,3 with N$_2$O$_4$ under the conditions described above gave evidence of dinitrimine production by the IR absorption spectrum of the ether solution (carbonyl absorption was also found). To avoid substantial decomposition during product isolation the compound should be kept in solution and isolated under an inert atmosphere or at a low temperature below 135°C.

The following example illustrates the preparation of compounds starting with open chain, more specifically, straight or branched-chain dioximes.

EXAMPLE 5

3,3-Dimethyl-2,4-dinitriminopentane

A solution of 15.8 g. (0.1 mole) of 3,3-dimethylpentane-2,4-dione dioxime in 500 ml. of absolute ethyl ether under nitrogen is cooled to 0°C. in an ice-salt bath. A cold solution of 18.4 g. (0.2 mole) of N$_2$O$_4$ in 200 ml. of ether is added dropwise with stirring while the temperature is maintained at 5° to 10°C. Stirring is continued for one hour, after which the mixture is allowed to rise to room temperature and stirring is continued overnight. Part of the ether is removed with a stream of nitrogen and the solution is subjected to column chromatography on alumina. The section containing the dinitrimine, identified by UV absorption maximum near 265 mμ of the n-hexane solution is eluted with n-hexane/ether and the product structure confirmed by analysis and absorption spectra as in preceding examples.

The invention that is claimed is:

1. A dinitrimine compound selected from the group consisting of

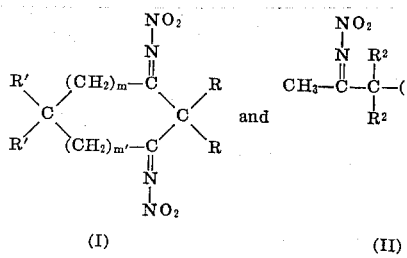 and 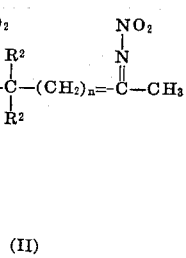

(I) (II)

in which each R is independently selected from the group consisting of alkyls of one to six carbon atoms, and each R' is independently selected from the group consisting of hydrogen and alkyls of one to six carbon atoms, while $m$ and $m'$ are similar or dissimilar integers from 0 to 2; and each $R^2$ is independently selected from the group consisting of hydrogen and lower alkyl of one to two carbon atoms, while $n$ is an integer 0 to 3; with the proviso that R' is alkyl when $m$ and $m'$ are both 0 and $R^2$ is a lower alkyl when $n$ is 0.

2. The compound of claim 1, formula I, in which R is methyl and R' is hydrogen.

3. The compound of claim 1, formula I, in which R and R' are each methyl.

4. The compound of claim 1, formula I, in which $m$ and $m'$ is 0.

5. The compound of claim 1, formula I, in which $m$ and $m'$ is 1.

6. The compound of claim 1, 2,2-dimethyl-1,3-dinitriminocyclohexane.

7. The compound of claim 1, 1,3-dinitrimino-2,2,5,5-tetramethylcyclohexane.

8. The compound of claim 1, anti-1,3-dinitrimino-2,2,4,4-tetramethylcyclobutane.

* * * * *

UNITED STATES PATENT OFFICE
CERTIFICATE OF CORRECTION

Patent No. 3,709,941    Dated January 9, 1973

Inventor(s) John F. De Bardeleben

It is certified that error appears in the above-identified patent and that said Letters Patent are hereby corrected as shown below:

Column 1, line 20, "formulas" should be -- formulae --.
Column 1, in the figure designated "(II)", the portion of the structure indicated to be "-(CH$_2$)$_n$ = - $\overset{O}{\overset{\|}{C}}$ -" should be -- -(CH$_2$)$_n$ - $\overset{O}{\overset{\|}{C}}$ - --.
Column 3, line 13, "cm$^-$" should be -- cm$^{-1}$ --.
Column 3, line 20, "C$_8$H$_{12}$NO$_4$" should be -- C$_8$H$_{12}$N$_4$O$_4$ --.
Column 4, line 41, "n-hex-" should be -- $\underline{n}$-hex- --.
Claim 1, in the figure designated "(II)", the portion of the structure indicated to be "-(CH$_2$)$_n$ = - $\overset{O}{\overset{\|}{C}}$ -" should be -- -(CH$_2$)$_n$ - $\overset{O}{\overset{\|}{C}}$ - --.

Signed and sealed this 9th day of April 1974.

(SEAL)
Attest:

EDWARD M. FLETCHER, JR.
Attesting Officer

C. MARSHALL DANN
Commissioner of Patents